United States Patent [19]

Balsells

[11] Patent Number: 5,072,070
[45] Date of Patent: Dec. 10, 1991

[54] DEVICE FOR SEALING ELECTROMAGNETIC WAVES

[75] Inventor: Peter J. Balsells, Santa Ana, Calif.

[73] Assignees: Peter J. Balsells; Joan C. Balsells, both of Santa Ana, Calif.

[21] Appl. No.: 444,287

[22] Filed: Dec. 1, 1989

[51] Int. Cl.$^5$ .......................... H05K 9/00; F16F 1/06
[52] U.S. Cl. .......................... 174/35 GC; 174/35 R; 267/167
[58] Field of Search .......... 174/35 GC, 35 R, 35 MS; 371/424; 219/10.55 R, 10.55 D; 277/227, 235 R, 235 B, 901; 267/167, 168

[56] References Cited

U.S. PATENT DOCUMENTS

| | | |
|---|---|---|
| 1,473,446 | 11/1923 | Scott . |
| 1,867,723 | 7/1932 | Adams . |
| 2,154,275 | 4/1939 | Linn . |
| 2,610,846 | 9/1952 | Hanna . |
| 2,721,091 | 10/1955 | Pfefferle et al. . |
| 2,859,033 | 11/1958 | Rose . |
| 3,061,060 | 10/1962 | Stephenson . |
| 3,126,440 | 3/1964 | Goodloe . |
| 3,183,010 | 5/1965 | Bram . |
| 3,323,785 | 6/1967 | Mather . |
| 3,468,527 | 9/1969 | Mather . |
| 3,502,784 | 3/1970 | Kunkel . |
| 3,504,095 | 3/1970 | Roberson et al. . |
| 4,572,921 | 2/1986 | May et al. . |
| 4,655,462 | 4/1987 | Balsells ......................... 277/164 |
| 4,754,101 | 6/1988 | Stickney et al. . |

FOREIGN PATENT DOCUMENTS

| | | |
|---|---|---|
| 0251158 | 1/1986 | European Pat. Off. . |
| 0339542 | 11/1989 | European Pat. Off. . |
| 0339545 | 11/1989 | European Pat. Off. . |
| WO87/01901 | 3/1987 | PCT Int'l Appl. . |
| 0372759 | 7/1973 | U.S.S.R. . |
| 0774417 | 5/1957 | United Kingdom .......... 174/35 GC |

Primary Examiner—Leo P. Picard
Assistant Examiner—Bot Lee Ledynh
Attorney, Agent, or Firm—Walter A. Hackler

[57] ABSTRACT

A resilient electromagnetic shielding gasket utilizes a plurality of conductive wire coils which are loaded in a manner so that coil spacing may be selectively adjusted at specific areas along the circumference thereof in order to provide an electromagnetic shield. Other portions along the circumference of the gasket provide sufficient biasing capability of take up for variations that may occur due to torquing, eccentricities, irregularities and other variables and thereby imminent contact between mating surfaces under load. The spacing along a seal-load portion of the gasket is selected to limit the passage of electromagnetic energy with a wavelength greater than a selected value.

61 Claims, 4 Drawing Sheets

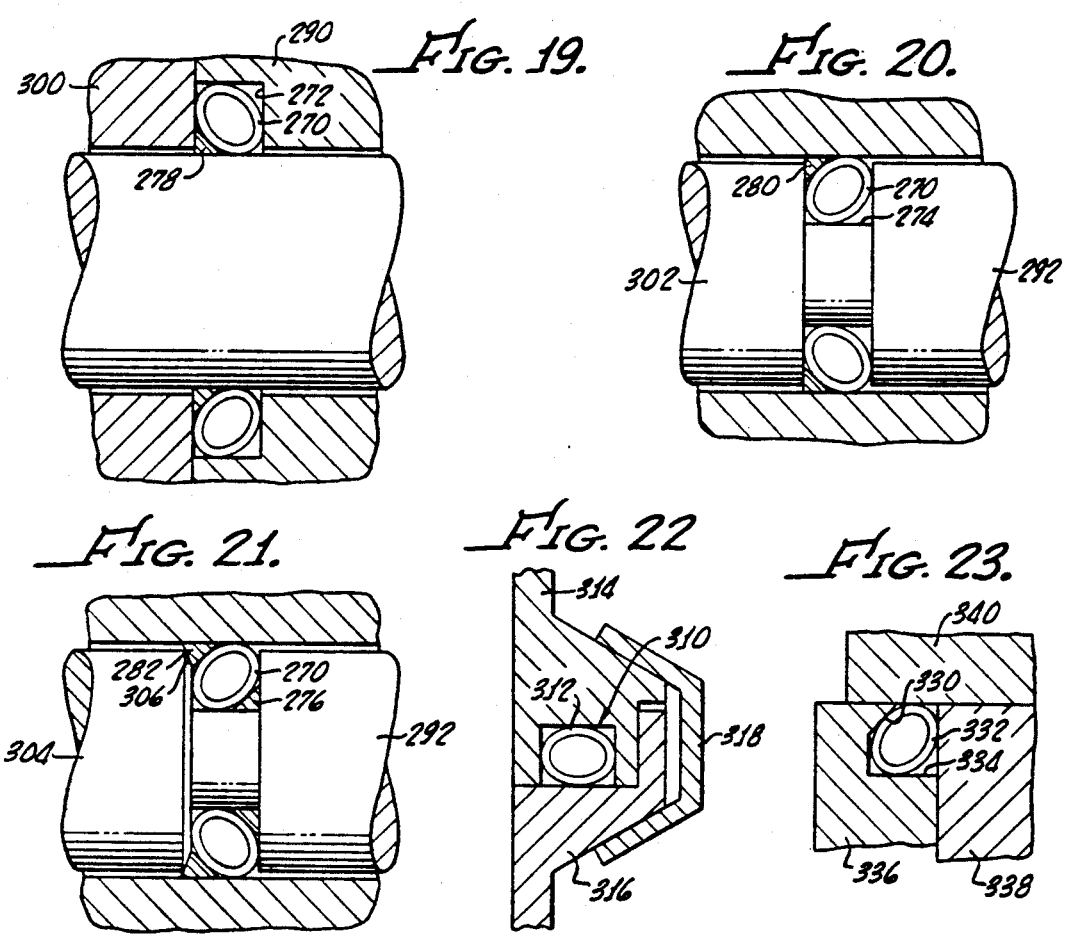
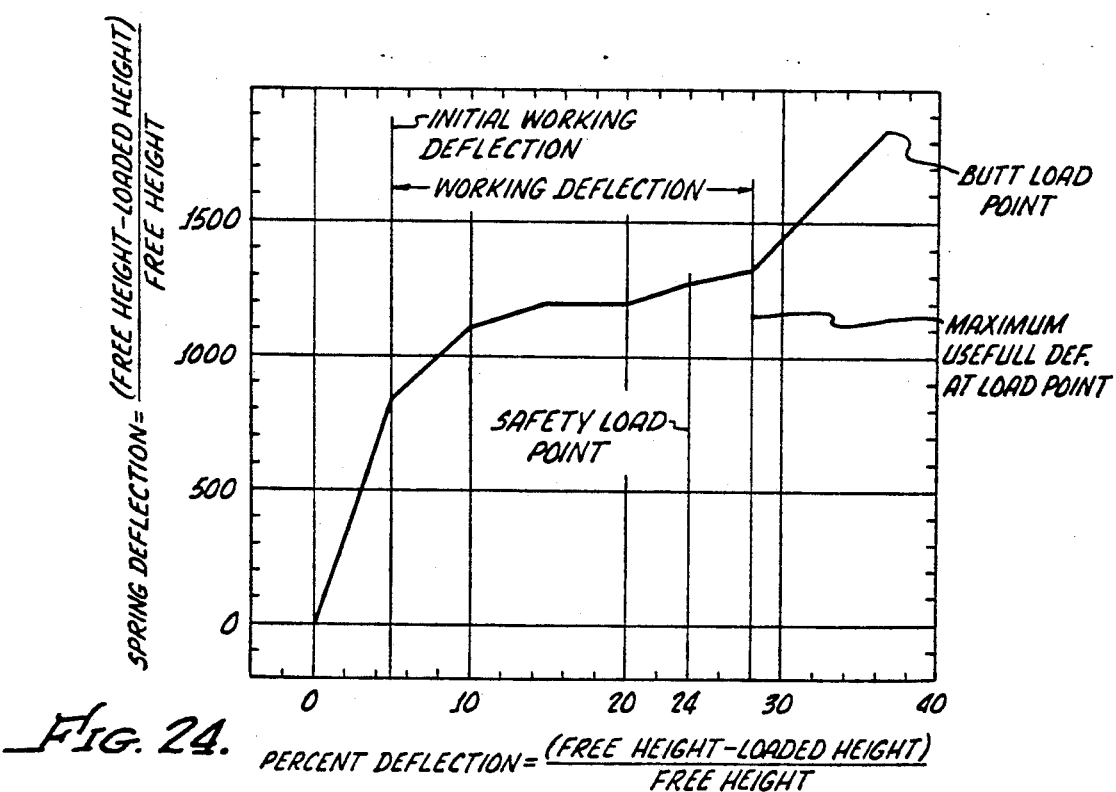

DEVICE FOR SEALING ELECTROMAGNETIC WAVES

The present invention generally relates to shielding devices for electrical components such as computers, radar equipment, and communications equipment, in addition to associated equipment which may require isolation from electromagnetic energy. More particularly, the invention relates to electrically conductive gaskets for enabling intimate contact between mating surfaces without the transmittal, or leakage, of electromagnetic energy therepast.

It is generally well known that electromagnetic transmission may be described by wave theory and, further, in terms of an electric and a magnetic field which travel in a 90 degree phase relationship with one another in free space. Wave theory describes electromagnetic energy in terms of wavelength and amplitude.

It should be appreciated that electromagnetic energy is used here as a generic term including the full spectrum of electromagnetic energy frequencies. Generally speaking, electromagnetic interference (EMI) and radio frequency interference (RFI) are used to describe interference caused by unwanted electromagnetic energy or radio frequency energy entering a designated piece of equipment.

The ability to shield a component from egress or ingress of electromagnetic energy is often called shield effectiveness.

Microwave energy having frequencies from about 100 KHz to about 300 GHz is commonly referred to as microwaves. The microwave frequencies spectrum may be further divided in three general groups, which include commercial bands, 100 Kz to 10 GHz, military bands, 10 GHz to 50 GHz and millimeter bands 50 GHz to 300 GHz.

Shield effectiveness of any particular frequency range is significantly affected by any gaps or openings therein which will allow electromagnetic fields to radiate therethrough unless current continuity can be preserved across the opening. The importance of the opening is, of course, dependent upon the frequency of the impinging electromagnetic energy.

As a general rule, for effective shielding in commercial use, the opening size should be less than the wavelength of the electromagnetic energy divided by 20. For military bands the opening size should be less than the wavelength divided by 50 and for the millimeter bands the opening should be less than the wavelength divided by 200. Because of the dependence on the wavelength, the effectiveness of any gasket may be determined at a particular frequency by the size of the openings or apertures therein.

State-of-the-art gaskets today include braided wire, sheet metal or elastomeric materials filled with metal particles, the metal particles being utilized to preserve the continuity of current flow in the gasket.

Unfortunately, these materials have a very low elastic limit and therefore are deformed under load. When this occurs, they fail to maintain intimate contact between mating surfaces and thereby allow electromagnetic waves to propagate therepast. This is especially true when the gasket is subjected to severe environmental changes in temperature and pressure.

Heretofore available gaskets have been unable to provide dimensional stability throughout the life of equipment in order to prevent the formation of unwanted gaps therein which may be unacceptable in terms of shield effectiveness. This is especially true when the gaskets are utilized in situations where repeated disassembly and assembly is needed with the gasket relied on to prevent EMI or RFI between components requiring such assembly.

The device of the present invention, however, provides an effective electromagnetic shield through the use of a plurality of conductive wire coils and means for loading the plurality of coils in a manner so that the coil spacing may be adjusted in selected areas along the circumference thereof in order to provide an electromagnetic shield. In addition, the gasket of the present invention provides sufficient biasing capability to take up for variations that may occur due to torquing, eccentricities, irregularities and other variables, and maintain intimate contact between mating surfaces under load.

SUMMARY OF THE INVENTION

In accordance with the present invention, a resilient electromagnetic shielding device includes a plurality of conductive wire coils canted along a centerline thereof and means for either loading or preloading the plurality of coils, in a manner causing coil spacing along the circumference of adjoining coils to be less along a seal-load portion thereof than along other coil portions on the circumference of the adjoining coils. The spacing along the seal-load portion is selected to limit the passage of electromagnetic energy with a wavelength greater than a selected value.

In one embodiment of the present invention, the hereinabove recited means loads or preloads the plurality of coils in a manner causing adjoining coils to abutt one another only along the seal-load portion on the circumference thereof to provide shielding against the passage of electromagnetic energy. Other coil portions on the circumference of adjoining coils remain in a spaced apart relationship enabling the plurality of coils to continuously bias mating surfaces between which it may be disposed.

In addition, back angle means may be provided for both defining the disposition of a trailing portion of each coil with respect to a line normal to the centerline and, importantly, for determining the working resilient range of the gasket. Front angle means may be provided for defining the disposition of a leading portion of each coil with respect to the normal line with the front angle means being greater than the back angle means.

In a preferred embodiment of the present invention, the back angle means defines a working resilient range wherein the gasket exhibits a generally constant force in response to deflection of the gasket. In this manner, minor variations, eccentricities or variations due to temperature and environmental conditions which may generally affect the spacing between mating parts do not affect the loading or sealing force therebetween provided by the gasket. This distinguishes the gasket of the present invention heretofore available as an electromagnetic shielding gasket.

In addition, means, orienting the plurality of coils at a turn angle maybe provided for controlling the magnitude of the generally constant force within the selected range of deflection.

While the overall shape of the plurality of coils may be linear or of any geometric configuration, they may be interconnected in a manner forming a continuous gasket which may take a circular shape. In this latter embodiment, the coils may be interconnected in a manner such that the trailing portion is along an inside diameter of the gasket and the leading portion is along an outside of the gasket, or the trailing portion may be disposed along an outside diameter of the gasket and the leading portion along an inside diameter of the gasket.

In another embodiment of the present invention, the means for loading or preloading the plurality of coils may be means defining a groove for holding the plurality of coils and wedge means for deflecting the plurality of coils along a minor axis thereof. The wedge means may be suspended in the groove means and biased by the plurality of coils against an opposing loading surface or the wedge means may be fixed to an opposing loading surface and the wedge may be fixed in the groove.

In this circular configuration, the seal-load portion of each coil collectively defines a load circle and the wedge means is operative for compressing the circular axially resilient gasket along the minor axis thereof for reducing the load circle.

The coils may be interconnected to provide for either an axially resilient electromagnetic shielding gasket or a radially resilient electromagnetic shielding gasket.

BRIEF DESCRIPTION OF THE DRAWINGS

The advantages and features of the present invention will appear from the following description and considered in conjunction with the accompanying drawings in which:

FIGS. 19, 20 and 21 are alternative embodiments of the present invention showing a wedge in position for compressing radially resilient electromagnetic gasket;

FIG. 22 shows a typical application of an embodiment of the present invention;

FIG. 23 shows an alternative embodiment of the present invention in which the groove is defined by mating portions thereby preloading the spring before loading thereof by a third mating member; and FIG. 24 is an axial load deflection curve for a typical axially resilient electromagnetic coil spring in accordance with the present invention.

DETAILED DESCRIPTION

A resilient electromagnetic shielding gasket in accordance with the present invention may be described, in part, by its load-deflection characteristics.

Depending on its application, a number of load deflection characteristics may be utilized; however, of particular use is a gasket which exerts a generally constant force in response to deflection of the gasket. This feature enables the gasket, in accordance with the present invention, to accommodate variations in mating surfaces between which electromagnetic shielding is to be provided. Such variations may be due to surface irregularities or temperature and pressure effects. Because deformation of the gasket in accordance with the present invention does not occur, it provides a stable, long-lived gasket capable of shielding against electromagnetic radiation in a consistent manner over time, despite temperature and pressure effects, and/or continued assembly and disassembly of mating parts.

Figure 1:
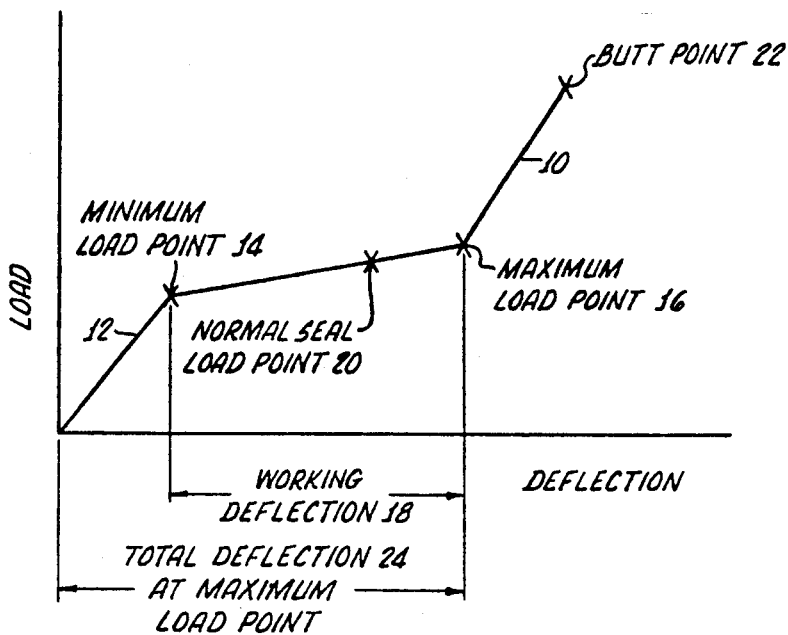
FIG. 1 is a theoretical load vs. a deflection curve illustrating the various parameters of a electromagnetic shielding gasket in accordance with the present invention.

For the purposes of describing a desirable load-deflection characteristic, an exemplary load-deflection curve 10 is shown in FIG. 1. As can be seen when a load is applied to the gasket, it deflects in a generally linear fashion as represented by the line segment 12 until it reaches a minimum load point 14 which represents the point at which, after the initial deflection, the load begins deflection, the load begins to remain relatively constant.

It should be appreciated that for an axially resilient gasket, hereinafter described, the load is applied axially and for a radially resilient gasket, hereinafter described, the load is applied radially.

Between the minimum load point 14 and a maximum load point 16, the load-deflection curve may be constant or show a slight increase as shown in FIG. 1. The area between the minimum load point 14 and the maximum load point 16 is known as a working deflection range 18.

The gasket is normally loaded for operation within this range, as indicated by the point 20, for a typical gasket in accordance with the present invention, for electromagnetic shielding purposes. In addition, the gasket also may provide sealing between the mating surfaces.

Loading of the gasket beyond the maximum load point 16 results in an abrupt deflection response until it reaches a butt point 22, which results in a permanent set in the gasket as a result of overloading. Also indicated in FIG. 1, is the total deflection range 24, which is defined as the deflection between the unloaded gasket and the deflection of the maximum load point 16.

A gasket, as hereinafter identified, in accordance with the present invention, may assume many forms. For example, it may be linear, have any irregular shape, or be interconnected to form a round, elliptical or other continuous shape, as hereinafter discussed.

Figure 3:
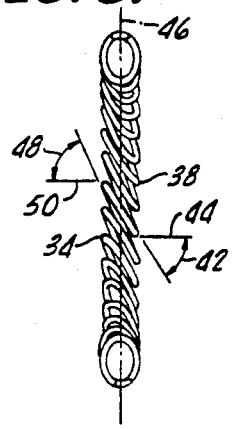
FIG. 3 is a cross-sectional view of the gasket shown in FIG. 2 taken along a line 3—3 and showing the relative position of the back angle and the front angle of the spring.
Figure 2:
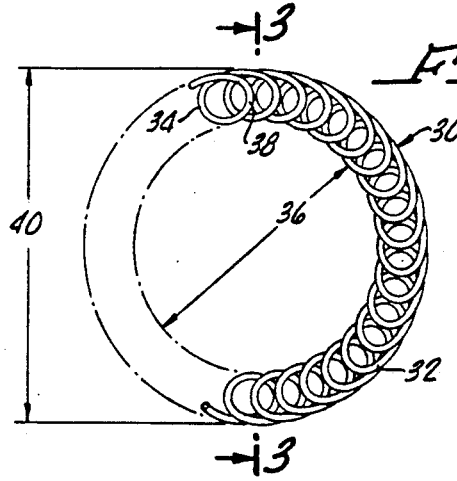
FIG. 2 is a plan view of an electromagnetic shielding gasket in which the coils are interconnected in a manner forming an axially resilient coil gasket with the trailing portion along an inside diameter of the gasket and the leading portion is along an outside diameter of the gasket, the coils being interconnected to produce a clockwise canting of the coils.

First, an axially resilient electromagnetic shield, or gasket, 30 as shown in FIG. 2, may have a plurality of coils 32 interconnected in a manner such that a trailing portion 34, see FIG. 3, is along an inside diameter 36 of the gasket 30 and a leading portion 38 is along an outside diameter 40 of the gasket 30. FIG. 2 shows the gasket 30 interconnected and wound with a clockwise canting of coils.

From FIG. 3, it can be seen that the back angle 42 provides means for defining the disposition of the trailing portion 34 of each coil with respect to a line 44 normal to the centerline 46 and a front angle 48 provides means for defining the disposition of the leading portion 38 of each coil with respect to a normal line 50. The back angle 42 additionally determines the working resilient range of the gasket as disclosed in U.S. Pat. No. 4,826,144 and U.S. Pat. No. 4,915,366. Specific details of the use of the back angle to determine the gasket resilient range are disclosed within these references, which are incorporated herewith by specific reference thereto, and not discussed in detail herein as they are elsewhere disclosed.

Figure 5:
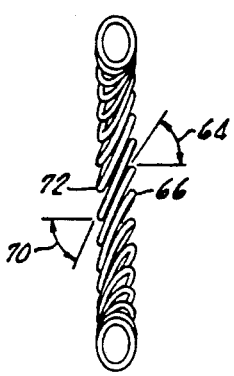
FIG. 5 is a cross-sectional view of the electromagnetic gasket of FIG. 4 taken along the line 5—5 and showing the relative positions of the front and the back angle.
Figure 4:
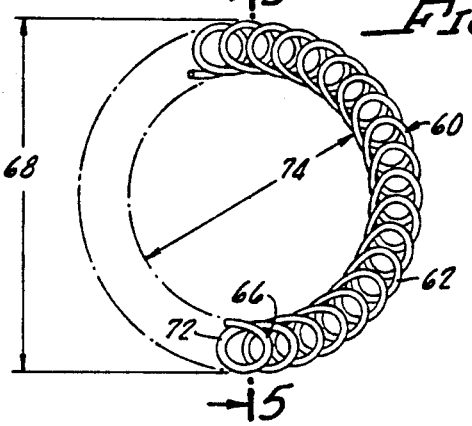
FIG. 4 is a plan view of an electromagnetic shielding gasket in accordance with the present invention in which the coils are interconnected to define an axially resilient electromagnetic shielding gasket having a back angle along the outside diameter of the gasket and a front angle along an inside diameter of the gasket, the coils being interconnected to produce a counter-clockwise canting of the coils.

Turning now to FIGS. 4 and 5, there is shown an axially resilient circular gasket 60 having a plurality of coils 62 interconnected in a fashion providing a counterclockwise canting of coils and as shown in FIG. 5, having a back angle 64 defining a trailing portion 66 along an outside diameter 68 and a front angle 70 defining a leading portion 72 along the inside diameter 74 of the gasket 60.

Figure 6:
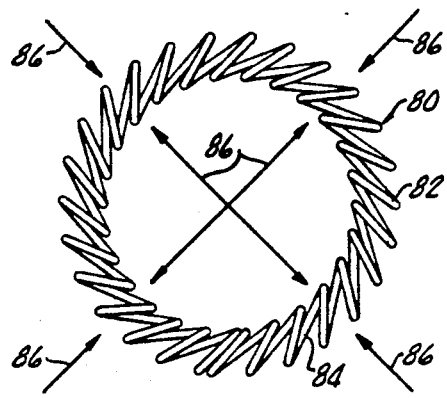
FIG. 6 is an electromagnetic gasket in accordance with the present invention in which the coils are interconnected to form a radially resilient electromagnetic gasket.

As shown in FIG. 6, another embodiment of the present invention, an electromagnetic gasket 80 may include a plurality of conductive coils 82 canted along a centerline 84 thereof and interconnected in a manner forming a circular radially resistant gasket. Loading of the gasket 80 occurs in a radial manner as indicated by the load arrows 86.

Figure 7:
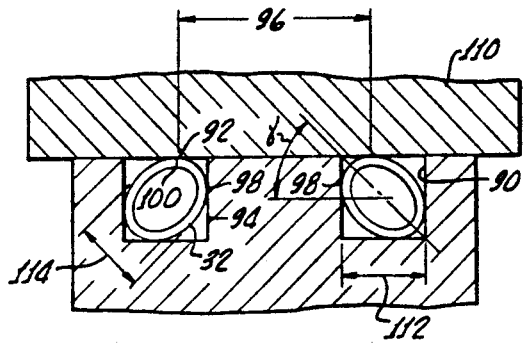
FIG. 7 shows an axially resilient electromagnetic gasket disposed in a cone position and having a turn angle of about 45 degrees.

Turning now to FIG. 7 there is shown in a diagrammatic cross-sectional manner the axially resilient gasket 30 disposed in a groove 90, which provides means for preloading the plurality of coils 32 in a manner causing coil spacing along the circumference of adjoining coils to be less along a seal-load portion 92 of each coil 32 than along other coil portions 94 on the circumference of adjoining coils 32. The coil spacing along these seal-load portions 92 is selected to limit the passage of electromagnetic energy with a wave length greater than a selected value.

Figure 8:
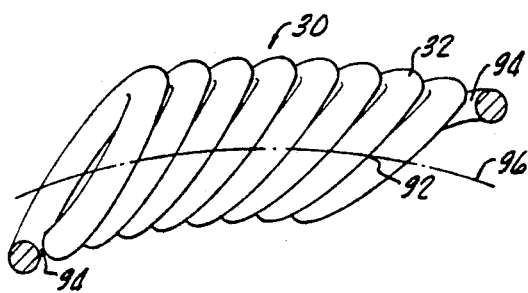
FIG. 8 is a perspective view of the axially resilient electromagnetic gasket of FIG. 7 taken along a load line and showing a load line, or circle, at which a portion of each coil in the electromagnetic gasket may abut upon preloading or loading thereof.

To more clearly show the relationship of the seal-load portion 92, a diagrammatic perspective view taken along a load circle 96 is shown in FIG. 8, the load line/circle 96 being collectively defined by the seal-load portions 92 of the coils 32.

As shown in FIG. 7, load sealing points 100 are coincident with the load circle 96 when the gasket 30 is disposed in the groove 90 at a load turn angle $\gamma$ 102 which may be from 30 degrees to 90 degrees, and preferably 45 degrees. The gasket 30 is shown in a "cone" configuration and as such develops a small load circle which is disposed proximate the gasket inside diameter 36 (See FIG. 2). After assembly of the gasket 30 into the groove 90, it is generally loaded by a flange 110.

The best shielding effectiveness is achieved when the coil dimensions are maximum in the groove 90 dimensions are at a minimum. The best performance is achieved when the back angle is on the inside diameter as opposed to being on the outside diameter. The groove width 112 may be either smaller, equal to or larger than the coil height 114.

In the configuration shown in FIG. 7, the gasket 30 will have a force-deflection characteristic which generally provides a force versus deflection where the force remains generally constant within the working deflection. However, if the assembly turn angle is greater than 70 degrees, there will be a tendency for snapping of the spring, which causes the force versus deflection curve to rise rapidly above the constant force and this is an indication that the fatiguing of the gasket may occur.

Figure 8A:
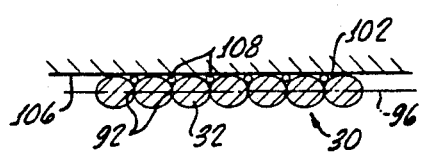
FIG. 8A is a cross-sectional view of the gasket shown in FIG. 8 taken along a load line.

FIG. 8a shows a cross-section of the gasket taken along the load-circle 96 which shows a minimum area 102 subtended by the surface of adjoining and abutting coils 32 and a load surface 106. A conductive wire 108 may be disposed between abutting coils 32 in the area 102 for providing insert means to further limit the passage of electromagnetic therepast, or between the abutting coils 32. The conductive insert wire 108 may have a circular or V shape cross-section in order to more fully occupy the area 102.

Figure 9:
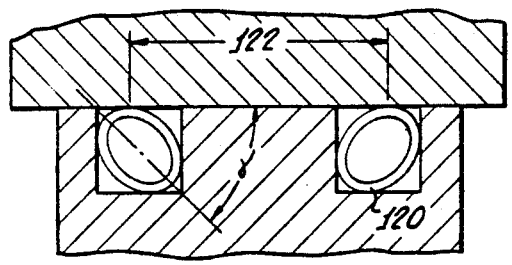
FIG. 9 is an axially resilient electromagnetic gasket shown in a loaded position and in an inverted cone position in which the load turn angle is about 45 degrees.

Turning now to FIG. 9, there is shown an alternative embodiment of the present invention in which an axially resilient gasket 120 is shown in a loading position having an axial turn angle which may be between 30 degrees and 90 degrees, a preferred turn angle of 45 degrees being shown. The gasket assumes an inverted cone shape and the position of the gasket is similar to the axial cone gasket except that upon assembling the gasket into the cavity is in an inverted position which is 180 degrees from the cone position.

The load circle 122 is substantially larger than in the axial cone type spring 30 and that allows greater open spacing between the coils occurs at the load circle 122. The force vs. deflection characteristics of this type gasket includes an initial higher peak above the constant force, particularly when the load turn angle $\gamma$ is greater than 70 degrees.

Figure 10:
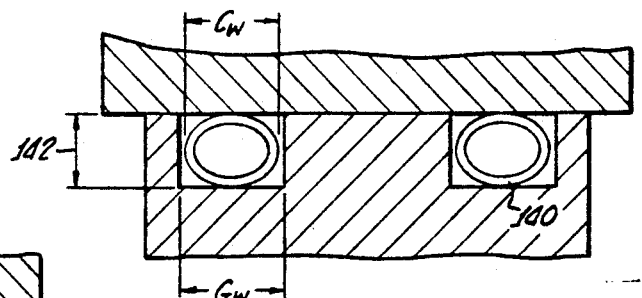
FIG. 10 is an axially resilient electromagnetic gasket loaded along the minor axis thereof with a spring turn angle of about 0 degrees.

As shown in FIG. 10, is an axially resilient gasket 140 as shown loaded along a minor axis 42 thereof. In this instance, the groove $G_W$ is greater than the coil width $C_W$.

Figure 11:
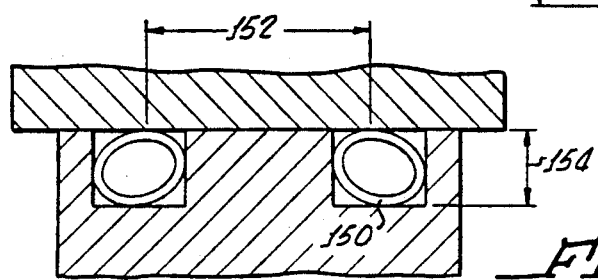
FIG. 11 is an axially resilient electromagnetic gasket loaded along the minor axis thereof, forming cone, the load turn angle may be from 0 degrees to 30 degrees, as shown it is about 15 degrees.

Another positioning of an axially resilient cone gasket 150 is shown in FIG. 11 in which the axial turn angle is between 0 and 30 degrees and the load along the load circle 152 is along a minor axis 154 of the gasket 150. More detailed description of a coil preloading and loading within the groove will be hereinafter discussed in greater detail.

Figure 12:
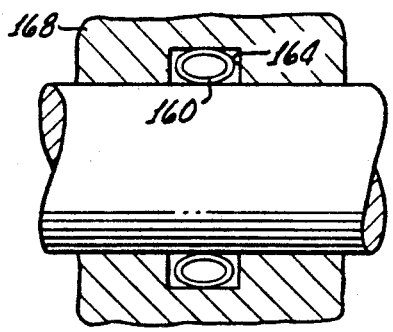
FIG. 12 is a radially resilient electromagnetic gasket disposed in a housing groove.
Figure 13:
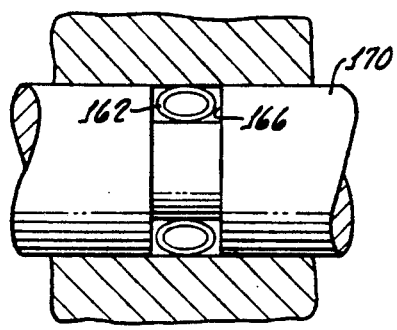
FIG. 13 is a radially resilient electromagnetic gasket disposed in a shaft groove.

Shown in FIGS. 12 and 13 are radial resilient gaskets 160, 162, respectively, in accordance with the present invention, shown within grooves 164 and 166, formed in a housing 168 and a shaft 170, respectively. The hereinafter discussed parameter regarding the positioning of the springs 160 and 162 within the grooves 164, 166, respectively, are similar to the groove spring relationship, as hereinafter discussed in connection with the axially resilient gaskets 30, 120, 140 and 150.

Figure 14:
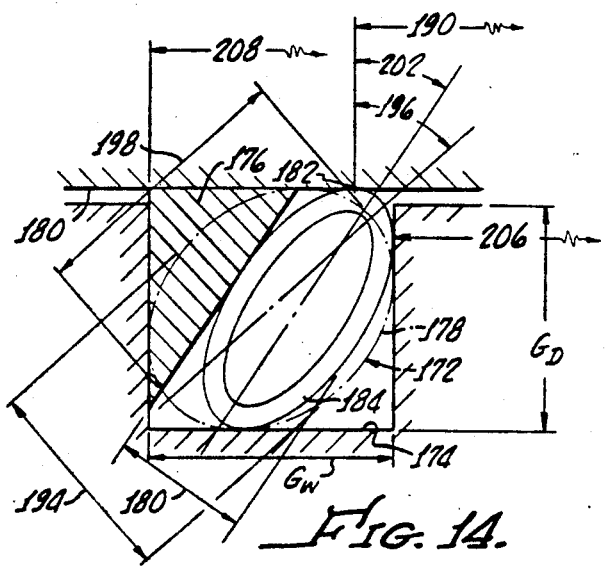
FIG. 14 is a diagram of an axially resilient electromagnetic gasket showing the loading thereof and showing a wedge for deflecting the gasket along the minor axis thereof, to a butt angle position.

FIG. 14 shows an enlarged view of an axially resilient electromagnetic shielding gasket 172 within a groove 174 and further including a wedge 176 which may be suspended in the groove 174 and biased by the plurality of coils 178 against an opposing loading surface 180 in order to cause coil spacing along the circumference of adjoining coils to be less along a load-seal portion 182 thereof than along other coiled portions 184 along the circumference thereof, as hereinbefore described, adjoining load-seal portions of coils 178 defining the load circle 190. With proper selection of coil groove and wedge dimensions, the coil can be made to abutt along the load circle, yet be in a spaced apart relationship along other portions 184 of the circumference. Wedge 176 is shown as a separate part, however, it can also be made as an integral part of the loading surface 180.

As shown in FIG. 14, the groove width $G_W$ may be equal to the groove depth $G_D$ and, for example, these dimensions may be in the order of 0.15 inches. The gasket 172 may have a coil height 194 at turn angle 196 of approximately 45 degrees and a coil width 198 of approximately 0.168 inches and form from wire having approximately 0.16 inch diameter.

As the gasket 172 is loaded within the groove 174 by the wedge 176, rotation of the spring occurs from the 45 degree load angle 196 to a butt turn angle 202, the load circle 190 being shown at the butt point. It can be seen that the coil height 194 decreases as the spring turns decreasing the load circle and therefore reducing the open spaces considerably. As the spring 172 is deflected, the coils 178 begin to butt at the minimum inside diameter 206. As loading then occurs along the load circle and the coils will progressively butt towards the outside diameter 208.

As shown in FIG. 8A showing abutting coils, minimum spacing occurs between the coils when they butt. In this case the maximum division of the exposed space 102 is equal to the wire diameter.

Figure 15:
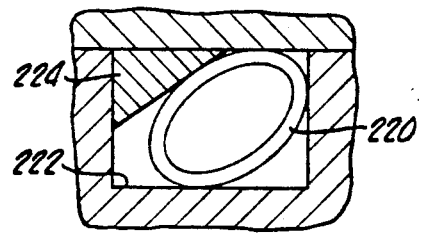
FIG. 15 is an alternative embodiment of the present invention.

An alternative embodiment of the present invention is shown in FIG. 15 in which a gasket 220 is disposed in a groove 222 and biased by a wedge 224 having a greater width than height. Wedge 224 can also be made as an integral part of the load surface as hereinabove described. Utilizing wedges 224 of different configurations, as for example, shown in FIG. 15, the rate of butting of the coil 220 from the inside diameter to the outside diameter as hereinabove described in connection with the gasket 172 may be varied. This enables load-deflection characteristics to be achieved with various groove widths $G_W$ and groove depths $G_D$.

It is important that along the load circle the coils either approach a butting relationship or remain in a butting relationship with the specific tolerances of the gasket and the groove dimensions. The fact that the coils butt from the inside diameter towards the outside diameter allows for a variation and tolerances of the groove and the gasket so as to avoid a complete butting of the coils which would damage the spring.

Figure 16:
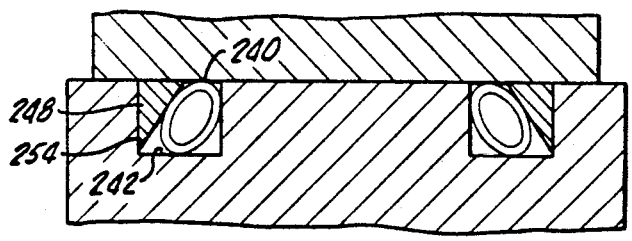
FIGS. 16, 17 and 18 are alternative embodiments of the present invention utilizing different shaped wedges and grooves.
Figure 17:
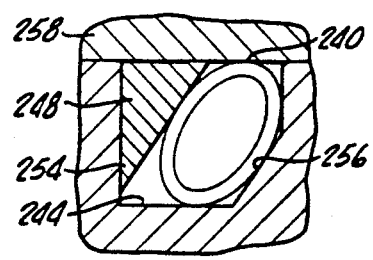
Figure 18:
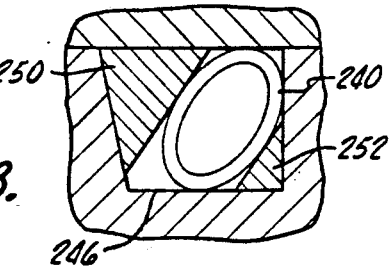

FIGS. 16, 17 and 18 show an axially resilient gasket 240 in combination with grooves 242, 244 and 246 and wedges 248, 250, 252, respectively. As hereinabove described, the wedge 248, 250, 252 may be an integral part of the loading surface. These alternative embodiments show the wedge 248 having a leg portion, 254 which can be used to modify the groove width.

Alternatively, as shown in FIG. 17, the groove 244 may have a tapered portion 256 for additionally compressing the spring 240 along the minor axis 258 thereof. Yet another embodiment is shown in FIG. 18 wherein the wedge 250 has a V shape and the groove 246 has a ramp portion 260 for cooperating with the wedge to bias the spring 240.

FIGS. 19, 20 and 21 show a radially resilient gasket 270 as it may be disposed in grooves 272, 274 and 276, respectively, along with loading by wedges 278, 180, 282. The gasket 270 may be housing 290 mounted or piston 292 mounted. Further, the groove 272, 274, 276 may be disposed in a single housing or a piston, not shown, or alteratively, may be formed in conjunction with a mating member 300, 302, 304, respectively. Similar to the mounting of the axially resilient gasket 240 a wedge shaped gasket 282 may be utilized when a beveled edge 306 incorporated into the mating member 304.

All of the embodiment shown in FIG. 16-21 as well as those shown in FIGS. 22 and 23 are only diagrammatically shown and briefly discussed since the principles of operation were more thoroughly discussed in connection with the gaskets 30 and 170.

For example, FIG. 22 shows a gasket 310 disposed in a groove 312 formed by mating portions 314, 316 which are held in position for biasing by the gasket 110 and by a clip member 318. FIG. 23 shows a built-in wedge 330 for biasing the gasket 332 within a groove 334 formed by right and left hand members 336, 338, with the gasket 332 being loaded by a flange 340.

FIG. 24 shows a specific load-deflection curve for a gasket made in accordance with the present invention having the dimensions set forth in the description of FIG. 14. In this instance the spring is made from wire having a circular cross-section with a diameter of 0.022 inches, a coil height of about 0.16 inches, a back angle of between about 13 and about 15 degrees, a front angle between about 29 and 31 degrees and coil spacing of between about 0.19 inches and 0.17 inches.

Although there has been described hereinabove a specific electromagnetic shielding gasket in accordance with the present invention for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A resilient electromagnetic shielding device comprising:

a plurality of conductive wire coils canted along a centerline thereof;

means for preloading said plurality of coils in a manner causing coil spacing along the circumference of adjoining coils to be less along a seal-load portion thereof than along other coil portions on the circumference of adjoining coils, said coil spacing along the seal-load portion being selected to limit the passage of electromagnetic energy with a wavelength greater than a selected value.

2. The resilient electromagnetic shielding device according to claim 1 further comprising back angle means for both defining the disposition of a trailing portion of each coil with respect to a line normal to the centerline and for determining the working resilient range of the gasket and front angle means for defining the disposition of a leading portion of each coil with respect to the normal line, said front angle means being greater than said back angle means.

3. The resilient electromagnetic shielding device according to claim 2 wherein the back angle means defines a working resilient range wherein the gasket exerts a generally constant force in response to deflection of the gasket.

4. The resilient electromagnetic shielding device according to claim 3 wherein said coils are interconnected in a manner forming a continuous gasket.

5. The resilient electromagnetic shielding device according to claim 4 wherein said coils are interconnected in a manner forming a circular axially resilient gasket.

6. The resilient electromagnetic shielding device according to claim 5 wherein said coils are interconnected in a manner such that the trailing portion is along an inside diameter of the gasket and the leading portion is along an outside diameter of the gasket.

7. The resilient electromagnetic shielding device according to claim 5 wherein said coils are interconnected in a manner such that the trailing portion is along an outside diameter of the gasket and the leading portion is along an inside diameter of the gasket.

8. A resilient electromagnetic shielding device according to claim 7 wherein said means for preloading comprises means for defining a groove for holding said plurality of conductive wire coils and wedge means for deflecting the plurality of coils along a minor axis thereof.

9. The resilient electromagnetic shielding device according to claim 8 wherein said wedge means is suspended in said groove means and biased by said plurality of coils against an opposing loading surface.

10. The resilient electromagnetic shielding device according to claim 8 wherein said wedge means is fixed to an opposing loading surface, said opposing loading surface being biased by said plurality of coils.

11. The resilient electromagnetic shielding device according to claim 1 wherein said coils are interconnected in a manner forming a circular axially resilient gasket and said seal-load portion is disposed adjacent an inside diameter of the circular axially resilient gasket, said seal-load portion of each coil collectively defining a load circle.

12. The resilient electromagnetic shielding device according to claim 11 further comprising means, compressing said circular axially resilient gasket along a minor axis thereof, for reducing the load circle.

13. The resilient electromagnetic shielding device according to claim 12 wherein the means for preloading comprises means defining a groove and said means comprising said circular axially resilient gasket comprises a wedge disposed in said groove.

14. The resilient electromagnetic shielding device according to claim 13 wherein said wedge is disposed in a fashion enabling movement thereof with the coils upon loading thereof.

15. The resilient electromagnetic shielding device according to claim 13 wherein said wedge is fixed.

16. A resilient electromagnetic shielding device according to claim 1 wherein said plurality of coils has a major axis and a minor axis with respect to the centerline and said means for preloading said plurality of coils comprises means defining a groove for holding said plurality of conductive wire coils with wedge portion means for deflecting the plurality of coils along a minor axis thereof.

17. A resilient electromagnetic shielding device comprising:
a plurality of conductive wire coils canted along a centerline thereof;
means for preloading said plurality of coils in a manner causing adjoining coils to abut one another only along a seal-load portion on the circumference thereof to provide shielding against the passage of electromagnetic energy, other coil portions on the circumference of adjoining coils remaining in a spaced apart relationship.

18. The resilient electromagnetic shielding device according to claim 17 further comprising insert means, disposed between abutting coils, for limiting passage of electromagnetic energy through an area subtended by the surface of each abutting coil and a loading surface contacting said abutting coils.

19. The resilient electromagnetic shielding device according to claim 18 wherein said insert means comprises a conductive wire having a generally round cross section.

20. The resilient electromagnetic shielding device according to claim 18 wherein said insert means comprises a conductive wire having a generally triangular cross-section.

21. The resilient electromagnetic shielding device according to claim 17 further comprising back angle means for both defining the disposition of a trailing portion of each coil with respect to a line normal to the centerline and for determining the working resilient range of the gasket and front angle means for defining the disposition of a leading portion of each coil with respect to the normal line, said front angle means being greater than said back angle means.

22. The resilient electromagnetic shielding device according to claim 21 wherein the back angle means defines a working resilient range wherein the gasket exerts a generally constant force in response to deflection of the gasket.

23. The resilient electromagnetic shielding device according to claim 20 wherein said coils are interconnected in a manner forming a continuous gasket.

24. The resilient electromagnetic shielding device according to claim 23 wherein said coils are interconnected in a manner forming a circular axially resilient gasket.

25. The resilient electromagnetic shielding gasket according to claim 24 wherein said coils are interconnected in a manner such that the trailing portion is along an inside diameter of the gasket and the leading portion is along an outside diameter of the gasket.

26. The resilient electromagnetic shielding device according to claim 24 wherein said coils are interconnected in a manner such that the trailing portion is along an outside diameter of the gasket and the leading portion is along an inside diameter of the gasket.

27. A resilient electromagnetic shielding device according to claim 17 wherein said means for loading comprises means for defining a groove for holding said plurality of conductive wire coils and wedge means for deflecting the plurality of coils along a minor axis thereof.

28. The resilient electromagnetic shielding device according to claim 27 wherein said wedge means is suspended in said groove means and biased by said plurality of coils against an opposing loading surface.

29. The resilient electromagnetic shielding device according to claim 27 wherein said wedge means is fixed to an opposing loading surface, said opposing loading surface being biased by said plurality of coils.

30. The resilient electromagnetic shielding device according to claim 17 wherein said coils are interconnected in a manner forming a circular axially resilient device and said seal-load portion is disposed adjacent an inside diameter of the circular axially resilient gasket, said seal-load portion of each coil collectively defining a load circle.

31. The resilient electromagnetic shielding device according to claim 30 further comprising means, comprises said circular axially resilient gasket along a minor axis thereof, for reducing the load circle.

32. The resilient electromagnetic shielding device according to claim 31 wherein the means for preloading comprises means defining a groove and said means comprising said circular axially resilient gasket comprises a wedge disposed in said groove.

33. The resilient electromagnetic shielding device according to claim 32 wherein said wedge is disposed in a fashion enabling movement thereof with the coils upon loading thereof.

34. The resilient electromagnetic shielding device according to claim 32 wherein said wedge is fixed relative to coil loading.

35. A resilient electromagnetic shielding device according to claim 17 wherein said plurality of coils has a major axis and a minor axis with respect to the centerline and said means for preloading said plurality of coils comprises means defining a groove for holding said plurality of conductive wire coils with wedge portion means for deflecting the plurality of coils along the minor axis thereof.

36. A resilient electromagnetic shielding device comprising:
a plurality of conductive coil means, interconnected and canted along a centerline thereof, for causing the gasket to exert a generally constant force over a selected range of deflection of the gasket in response to loading thereof;
means, orienting said plurality of coil means at a turn angle for controlling the magnitude of the generally constant force within the selected range of deflection and for causing coil spacing along the circumference of adjoining coils to be less along a seal-load portion thereof than along other coil portions on the circumference of adjoining coils, said coil spacing along the seal-load portion being selected to limit the passage of electromagnetic energy with a wavelength greater than a selected value, said turn angle being greater than zero degrees and less than 90 degrees.

37. The resilient electromagnetic shielding device according to claim 36 wherein said turn angle is about 45 degrees.

38. The resilient electromagnetic shielding device according to claim 35 further comprising back angle means for both defining the disposition of a trailing portion of each coil with respect to a line normal to the centerline and for determining the working resilient range of the gasket and front angle means for defining the disposition of a leading portion of each coil with respect to the normal line, said front angle means being greater than said back angle means.

39. The resilient electromagnetic shielding device according to claim 38 wherein the back angle means defines a working resilient range wherein the gasket exerts a generally constant force in response to deflection of the gasket.

40. The resilient electromagnetic shielding device according to claim 37 wherein said coils are interconnected in a manner forming a continuous gasket.

41. The resilient electromagnetic shielding device according to claim 40 wherein said coils are interconnected in a manner forming a circular axially resilient gasket.

42. The resilient electromagnetic shielding device according to claim 41 wherein said coils are interconnected in a manner such that the trailing portion is along an inside diameter of the gasket and the leading portion is along an outside diameter of the gasket.

43. The resilient electromagnetic shielding device according to claim 42 wherein said coils are interconnected in a manner such that the trailing portion is along an outside diameter of the gasket and the leading portion is along an inside diameter of the gasket.

44. A resilient electromagnetic shielding device according to claim 36 wherein said means for orienting said plurality of coil means comprises means for defining a groove for holding said plurality of conductive wire coils and wedge means for deflecting the plurality of coils along the minor axis thereof.

45. The resilient electromagnetic shielding device according to claim 44 wherein said wedge means is suspended in said groove means and biased by said plurality of coils against an opposing loading surface.

46. The resilient electromagnetic shielding device according to claim 44 wherein said wedge means is fixed to an opposing loading surface, said opposing loading surface being biased by said plurality of coils.

47. The resilient electromagnetic shielding device according to claim 44 wherein said coils are interconnected in a manner forming a circular axially resilient gasket and said seal-load portion is disposed adjacent an inside diameter of the circular axially resilient gasket, said seal-load portion of each coil collectively defining a load circle.

48. The resilient electromagnetic shielding device according to claim 47 further comprising means, comprises said circular axially resilient gasket along a minor axis thereof, for reducing the load circle.

49. The resilient electromagnetic shielding device according to claim 48 wherein the means for loading comprises means defining a groove and said means comprising said circular axially resilient gasket comprises a wedge fixed in said groove.

50. The resilient electromagnetic shielding device according to claim 49 wherein said wedge is disposed in a fashion enabling movement thereof with the coils upon loading thereof.

51. The resilient electromagnetic shielding device according to claim 50 wherein said wedge is fixed relative to coil loading.

52. A resilient electromagnetic shielding device according to claim 44 wherein said plurality of conductive coil means has a major axis and a minor axis with respect to the centerline and said means for preloading said plurality of coils comprises means defining a groove for holding said plurality of conductive wire coils with wedge portion means for deflecting the plurality of coils along the minor axis thereof.

53. A resilient electromagnetic shielding device comprising:
   a plurality of conductive wire coils canted along a centerline thereof; said coils being interconnected in a manner forming a circular radially resilient gasket;
   means for preloading said plurality of coils in a manner causing coil spacing along the circumference of adjoining coils to be less along a seal-load portion thereof than along other coil portions on the circumference of adjoining coils, said coil spacing along the seal-load portion being selected to limit the passage of electromagnetic energy with a wavelength greater than a selected value.

54. The resilient electromagnetic shielding device according to claim 53 wherein the means for preloading comprises means defining a groove and said means compressing said circular radially resilient gasket comprises a wedge disposed in said groove.

55. The resilient electromagnetic shielding device according to claim 54 wherein said wedge is disposed in a fashion enabling movement thereof with the coils upon loading thereof.

56. The resilient electromagnetic shielding device according to claim 50 wherein said wedge is fixed.

57. A resilient electromagnetic shielding device comprising:
   a plurality of conductive wire coils canted along a centerline thereof, said coils being interconnected in a manner forming a circular radially resilient gasket;
   means for preloading said plurality of coils in a manner causing adjoining coils to abut one another only along a seal-load portion on the circumference thereof to provide shielding against the passage of electromagnetic energy, other coil portions on the circumference of adjoining coils remaining in a spaced apart relationship.

58. The resilient electromagnetic shielding device according to claim 57 wherein the means for preloading comprises means defining a groove and wedge means, disposed in said groove, for deflecting the plurality of conductive wire coils along a miner axis thereof.

59. The resilient electromagnetic shielding device according to claim 58 wherein said wedge is disposed in a fashion enabling movement thereof with the coils upon loading thereof.

60. A resilient electromagnetic shielding device comprising:
   a plurality of conductive wire coils canted along a centerline thereof, and having a major and a minor axis with respect thereto;
   means for loading said plurality of coils in a manner causing coil spacing along the circumference of adjoining coils to be less along a seal-load portion thereof than along other coil portion on the circumference of adjoining coils, said coil spacing along the seal-load portion being selected to limit the passage of electromagnetic energy with a wavelength greater than a selected value.

61. A resilient electromagnetic shielding device comprising:
   a plurality of conductive wire coils canted along a centerline thereof, and having a major and a minor axis with respect thereto;
   means for loading said plurality of coils in a manner causing adjoining coils to abut one another only along a seal-load portion on the circumference thereof to provide shield against the passage of electromagnetic energy, other coil portions on the circumference of adjoining coils remaining in a spaced apart relationship.

* * * * *